Dec. 27, 1938.  S. E. BOUCHARD  2,141,287
OPHTHALMIC MOUNTING
Filed Nov. 23, 1936

SAMUEL E. BOUCHARD
*INVENTOR.*

BY

*ATTORNEYS*

Patented Dec. 27, 1938

2,141,287

UNITED STATES PATENT OFFICE 2,141,287

OPHTHALMIC MOUNTING

Samuel E. Bouchard, Rochester, N. Y., assignor to Bausch & Lomb Optical Company, Rochester, N. Y., a corporation of New York Application November 23, 1936, Serial No. 112,277

2 Claims. (Cl. 88—49)

This invention relates to ophthalmic mountings and more particularly it has reference to ophthalmic mountings having nose pads which are vertically adjustable so as to selectively position the various vision fields of mutifocal lenses before the eyes.

In bifocal lenses which are commonly used, the reading or near vision portions are usually of relatively small areas and are located at or adjacent to the lower edges of the lenses. The distant vision portion is of a much larger area and is generally used a great deal more than the reading portion. In using such lenses for reading, the wearer is required to look downwardly through the reading segments and assume rather tiresome and awkward positions. In order to overcome this disadvantage, it has been proposed to provide vertically adjustable nose pads which permit the selective vertical positioning of the distant and near vision portions directly in front of the eyes.

One of the objects of my invention is to provide an improved ophthalmic mounting of the type described. Other objects are to provide such a mounting with convenient means for manipulating the adjustable nose pads while still producing a relatively simple and neat appearing device. These and other objects reside in certain novel features of construction, arrangement and combination of parts as will hereinafter be more fully described and pointed out in the appended claims.

Referring to the drawing.

Figure 1:
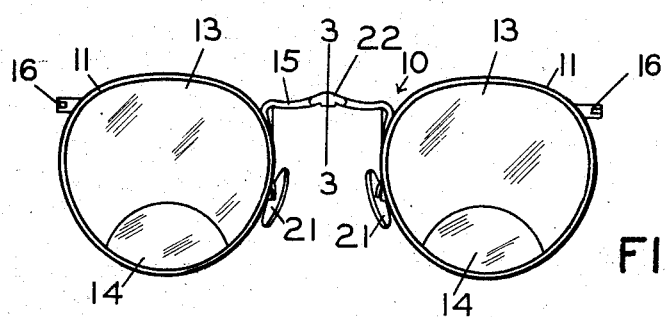
Fig. 1 is a front elevation of an ophthalmic mounting embodying my invention.

One embodiment of my invention is shown in the drawing wherein 10 indicates, generally, a spectacle frame comprising the two eyewires 11 which hold lenses having distant vision fields 13 and reading vision fields 14. The eyewires 11 are connected by a suitable bridge 15 as by soldering, for example. The temporal sides of the eyewires 11 carry endpieces 16 adapted to carry temples, not shown, in the usual manner. Secured to the rear face and adjacent the nasal edge of each eyewire 11 is a tubular member 17. A second auxiliary or bridge member 18, extending between the eyewires 11, has spaced, vertical projections 19, each of which is slidably mounted in a tubular member 17. An arm 20, carrying a nose engaging element 21, is attached to the lower end of each projection 19. The member 18 carries, preferably at its center, a clip 22 comprising a forwardly extending horizontal part 23 and an upwardly extending part 24. The clip 22 may be either formed integrally with member 18 or it may be formed separately and secured, as by soldering, for example, to member 18.

Figure 2:
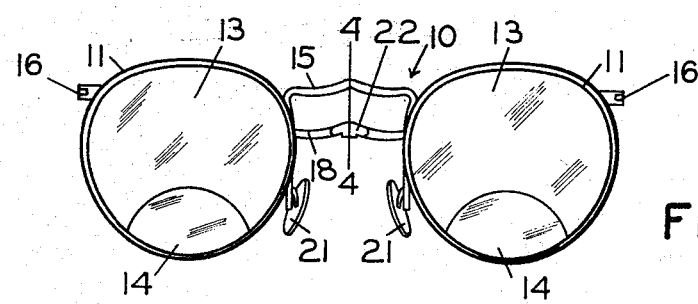
Fig. 2 is a similar view showing the lenses raised relatively to the nose pads so as to position the lenses for use in reading.
Figure 3:
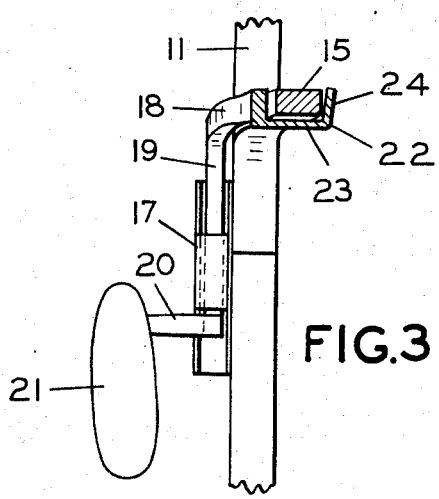
Fig. 3 is an enlarged fragmentary view taken on line 3—3 of Fig. 1.
Figure 4:
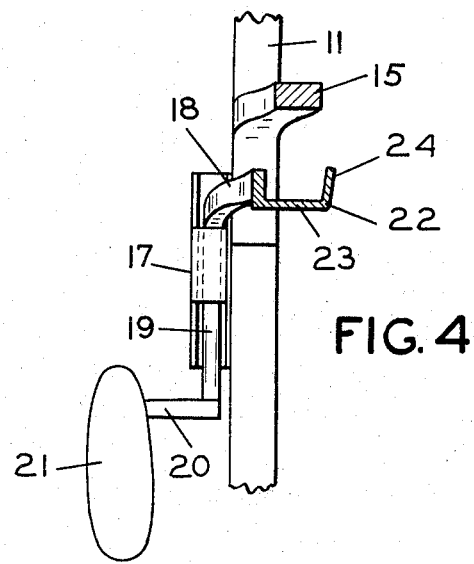
Fig. 4 is a similar view taken on line 4—4 of Fig. 2.

In operation, a spectacle frame embodying my invention would appear as in Fig. 1 when the distant vision portions 13 were in use. If it is desired to use the near vision portions 14, as for reading, the wearer holds the spectacle frame 10 with one hand and with a finger on the other hand pulls down on the clip 22. This action brings the parts into the position shown in Fig. 2 so that the lenses have been raised vertically, with respect to the nose pads, to bring the near vision portions 14 before the eyes. The parts are held in such position by a slight amount of frictional engagement between the projections 19 and tubular members 17. To return the parts to normal position, the forefinger and thumb of one hand pull the bridge 15 and member 18 together.

From the foregoing, it will be apparent that I am able to attain the objects of my invention and provide an improved mounting of the type described. Although I have shown my invention only as applied to lens holding devices which completely encircle the lenses, it is obvious that it can be applied equally well to lens holding devices used on the so-called rimless or semi-rimless types of spectacles. My invention provides an efficient, yet simple and neat-appearing mounting of the type described. In fact, from the embodiment shown in Fig. 1 it is difficult to ascertain that the spectacle frame embodies the adjustable nose pads. The auxiliary member 18 is completely hidden behind the bridge 15 and the clip 22 is so made that it blends into the design of bridge 15. Various modifications can obviously be made without departing from the spirit of my invention.

I claim:

1. An ophthalmic mounting comprising spaced lens holding devices, a bridge secured to and connecting said lens holding devices, a member extending between said devices and having vertical portions which are slidably mounted on said devices, a nose pad carried by each of the vertical portions, said member being positioned behind said bridge when at the upper limit of its excursion, a clip on said member, said clip extending forwardly from the lower edge of said member to a point beyond the front face of said bridge so as to provide a finger engaging piece for moving said member and its attached nose pads.

2. An ophthalmic mounting of the type described comprising a pair of lens holding devices, a bridge connecting said devices, a member extending between said devices, said member having a pair of vertical projections, said projections being mounted, respectively, on said devices and constructed and arranged for sliding movement thereon, a nose engaging element carried by each of the projections, said member being positioned behind said bridge when said member is at the upper limit of its movement, a finger engaging clip comprising a substantially horizontal part secured to the central portion of said member and a second part extending upwardly from said horizontal part, said parts being positioned, respectively, underneath and in front of said bridge when said member is at the upper limit of its movement.

SAMUEL E. BOUCHARD.